US008390608B2

(12) United States Patent
Park et al.

(10) Patent No.: US 8,390,608 B2

(45) Date of Patent: Mar. 5, 2013

(54) PLASMA DISPLAY APPARATUS

(75) Inventors: Dong Hyun Park, Gumi-si (KR); Seok Ho Kim, Gumi-si (KR); Young Seop Moon, Gumi-si (KR); Hyung Jae Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 12/487,692

(22) Filed: Jun. 19, 2009

(65) Prior Publication Data

US 2010/0073342 A1 Mar. 25, 2010

(30) Foreign Application Priority Data

Sep. 22, 2008 (KR) ........................ 10-2008-0092837

(51) Int. Cl.
*G06F 3/038* (2006.01)
*G09G 5/00* (2006.01)
*G09G 3/28* (2006.01)

(52) U.S. Cl. ........................... 345/210; 345/208; 345/60

(58) Field of Classification Search .................. 345/210, 345/208, 60
See application file for complete search history.

(56) References Cited

U.S. PATENT DOCUMENTS

| | | | | |
|---|---|---|---|---|
| 2002/0063663 | A1 * | 5/2002 | Homma | 345/60 |
| 2005/0110713 | A1 * | 5/2005 | Chung et al. | 345/60 |
| 2005/0248504 | A1 * | 11/2005 | Kim et al. | 345/60 |
| 2006/0164340 | A1 * | 7/2006 | Chung et al. | 345/67 |
| 2007/0024530 | A1 * | 2/2007 | Jung et al. | 345/60 |
| 2007/0285374 | A1 * | 12/2007 | Choi | 345/99 |
| 2009/0146984 | A1 * | 6/2009 | Bae et al. | 345/208 |

* cited by examiner

*Primary Examiner* — Alexander S Beck
*Assistant Examiner* — Joseph Pena
(74) *Attorney, Agent, or Firm* — Fish & Richardson P.C.

(57) ABSTRACT

A plasma display apparatus according to the present invention efficiently accumulates charges in respective electrodes, using a driving signal supplied in a second set-down period, to prevent a flickering erroneous discharge caused by deficiency of wall charges. As a result, the plasma display apparatus can improve picture quality of a display image.

20 Claims, 10 Drawing Sheets

PLASMA DISPLAY APPARATUS

CROSS-REFERENCE TO RELATED APPLICATION

This application claims under 35 U.S.C. §119(a) the benefit of Korean Patent Application No. 10-2008-0092837 filed Sep. 22, 2008, the entire contents of which are incorporated herein by reference.

BACKGROUND OF THE INVENTION

1. Field of the Invention

The present invention relates to a plasma display apparatus, and more particularly, to an apparatus for driving a plasma display panel.

2. Description of the Conventional Art

A plasma display apparatus includes a panel in which a plurality of discharge cells are formed between a rear substrate, having barrier ribs formed therein, and a front substrate. The plasma display apparatus is an apparatus displaying an image by emitting phosphors with vacuum ultraviolet rays, which are generated by selectively discharging the plurality of discharge cells according to input picture signals.

In order to display an image effectively, the plasma display apparatus generally includes a driving controller, which processes input picture signals and outputs the processed signals to a driver for supplying driving signals to the plurality of electrodes included in the panel.

In the case of a plasma display apparatus having a large-sized screen, it is necessary to drive a panel at a high speed and stably generate a discharge.

SUMMARY OF THE INVENTION

In accordance with one embodiment of the present invention for achieving the foregoing object, there is provided a plasma display apparatus including a plurality of scan electrodes and sustain electrodes, wherein the plurality of scan electrodes are divided into two or more groups including first and second groups, and one frame is composed of a plurality of subfields, wherein at least one of the plurality of subfields sequentially includes: a first scan period during which a scan signal is supplied to the first group; a first sustain period during which a signal having a voltage of positive polarity is supplied to the first and second groups; a second set-down period during which the voltage of the first group gradually falls and a voltage of negative polarity is supplied to the second group; and a second scan period during which a scan signal is supplied to the second group, an absolute value of a sustain bias voltage of positive polarity supplied to the sustain electrodes being larger than an absolute value of the lowest voltage of the first group in the second set-down period.

In accordance with another embodiment of the present invention, there is provided a plasma display apparatus, wherein at least one of the plurality of subfields includes: a first scan period during which a scan signal is supplied to the first group; a second set-down period during which a voltage gradually falling from a second voltage of positive polarity is supplied to the first group and a voltage of negative polarity is supplied to the second group; and a second scan period during which a scan signal is supplied to the second group.

In accordance with a further embodiment of the present invention, there is provided a plasma display apparatus, wherein at least one of the plurality of subfields sequentially includes: a first scan period during which a scan signal is supplied to the first group; a first sustain period during which a sustain signal having a size of a first voltage of positive polarity is supplied to the first and second groups; a second set-down period during which a voltage gradually falling from a second voltage of positive polarity is supplied to the first group and a voltage of negative polarity is supplied to the second group; and a second scan period during which a scan signal is supplied to the second group.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
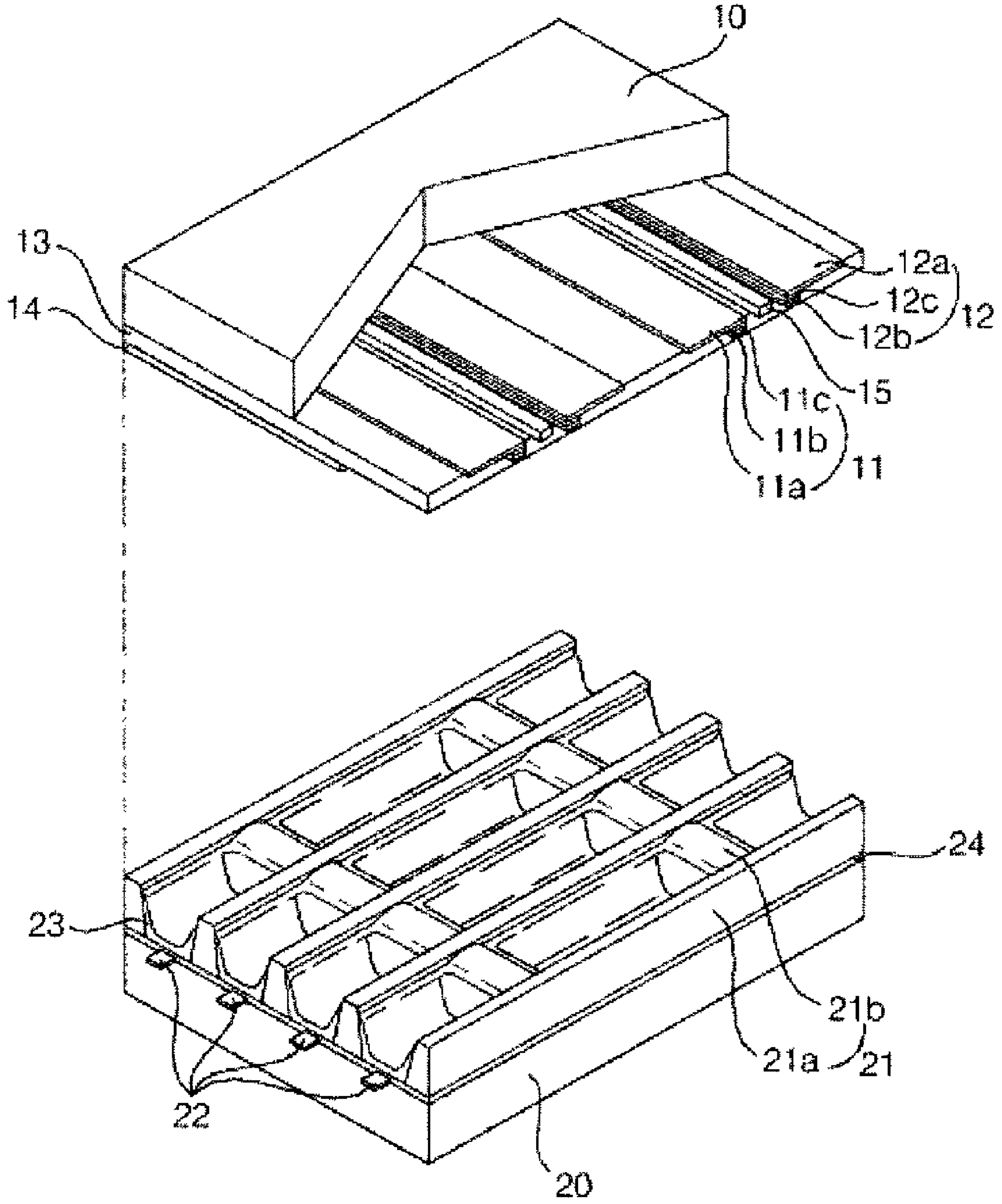
FIG. 1 is a perspective view showing an embodiment with respect to the structure of a plasma display panel.

Hereinafter, a method of driving a plasma display panel and a plasma display apparatus employing the same according to the preset invention will be described in detail with reference to the accompanying drawings. FIG. 1 is a perspective view showing an embodiment with respect to the structure of a plasma display panel according to the present invention.

As shown in FIG. 1, the plasma display panel includes scan electrodes 11 and sustain electrodes 12 (i.e., sustain electrode pairs), which are formed over a front substrate 10, and address electrodes 22 formed over a rear substrate 20.

Each sustain electrode pair 11 and 12 includes transparent electrodes 11*a* and 12*a*, generally formed from indium-tin-oxide (ITO), and bus electrodes 11*b* and 12*b*. The bus electrodes 11*b* and 12*b* may be formed from metal, such as silver (Ag) or chrome (Cr), a stack type of Cr/copper (Cu)/Cr or Cr/aluminum (Al)/Cr. The bus electrodes 11*b* and 12*b* are formed on the transparent electrodes 11*a* and 12*a*, and function to decrease a voltage drop caused by the transparent electrodes 11*a* and 12*a* with a high resistance.

Meanwhile, according to an embodiment of the present invention, the sustain electrode pair 11 and 12 may have a stack structure of the transparent electrodes 11*a* and 12*a* and the bus electrodes 11*b* and 12*b*, but also include only the bus electrodes 11*b* and 12*b* without the transparent electrodes 11*a* and 12*a*. This structure is advantageous in that it can save the manufacturing cost of the plasma display panel because the transparent electrodes 11*a* and 12*a* are not used. The bus electrodes 11*b* and 12*b* used in the structure may also be formed using a variety of materials, such as a photosensitive material, other than the above-listed materials.

Black matrices 15 are arranged between the transparent electrodes 11*a* and 12*a* and the bus electrodes 11*b* and 12*b* of the scan electrode 11 and the sustain electrode 12. The black matrix 15 has a light-shielding function of absorbing external light generated outside the front substrate 10 and decreasing reflection of the light and a function of improving the purity and contrast of the front substrate 10.

The black matrices 15 according to an embodiment of the present invention are formed over the front substrate 10. Each black matrix 15 may include a first black matrix 15 formed at a location where it is overlapped with a barrier rib 21, and second black matrices 11*c* and 12*c* formed between the transparent electrodes 11*a* and 12*a* and the bus electrodes 11*b* and 12*b*. The first black matrix 15, and the second black matrices 11*c* and 12*c*, which are also referred to as black layers or black electrode layers, may be formed at the same time and, therefore, may be connected physically. Alternatively, they may not be formed at the same time and, therefore, may not be connected physically.

Further, in the case in which the first black matrix 15 and the second black matrices 11*c* and 12*c* are connected to each other physically, the first black matrix 15 and the second black matrices 11*c* and 12*c* are formed using the same material. However, in the case in which the first black matrix 15 and the second black matrices 11*c* and 12*c* are physically separated from each other, they may be formed using different materials.

An upper dielectric layer 13 and a protection layer 14 are laminated over the front substrate 10 in which the scan electrodes 11 and the sustain electrodes 12 are formed in parallel. Charged particles generated by a discharge are accumulated on the upper dielectric layer 13. The upper dielectric layer 13 and the protection layer 14 may function to protect the sustain electrode pair 11 and 12. The protection layer 14 functions to protect the upper dielectric layer 13 from sputtering of charged particles generated at the time of a gas discharge and also increase emission efficiency of secondary electrons.

The address electrodes 22 cross the scan electrodes 11 and the sustain electrodes 12. A lower dielectric layer 24 and the barrier ribs 21 are formed over the rear substrate 20 over which the address electrodes 22 are formed.

Phosphor layers 23 are formed on the surfaces of the lower dielectric layer 24 and the barrier ribs 21. Each barrier rib 21 has a longitudinal barrier rib 21*a* and a traverse barrier rib 21*b* formed in a closed type. The barrier rib 21 functions to partition discharge cells physically and prevent ultraviolet rays, which are generated by a discharge, and a visible ray from leaking to neighboring discharge cells.

The embodiment of the present invention may also be applied to not only the structure of the barrier ribs 21 shown in FIG. 1, but also various forms of structures of the barrier ribs 21. For example, the present embodiment may be applied to a differential type barrier rib structure in which the longitudinal barrier rib 21*a* and the traverse barrier rib 21*b* have different heights, a channel type barrier rib structure in which a channel, which can be used as an exhaust passage, is formed in at least one of the longitudinal barrier rib 21*a* and the traverse barrier rib 21*b*, a hollow type barrier rib structure in which a hollow is formed in at least one of the longitudinal barrier rib 21*a* and the traverse barrier rib 21*b*, and so on.

In the differential type barrier rib structure, the traverse barrier rib 21*b* may preferably have a higher height than the longitudinal barrier rib 21*a*. In the channel type barrier rib structure or the hollow type barrier rib structure, a channel or hollow may be preferably formed in the traverse barrier rib 21*b*.

Meanwhile, in the present embodiment, it has been described and shown that the red (R), green (G), and blue (B) discharge cells are arranged on the same line. However, they may be arranged in different forms. For example, the R, G, and B discharge cells may also have a delta type arrangement of a triangle. Alternatively, the discharge cells may be arranged in various forms, such as square, pentagon and hexagon.

Furthermore, the phosphor layer 23 is excited with ultraviolet rays generated during the discharge of a gas, thus generating a visible ray of one of R, G, and B. Discharge spaces between the front/rear substrates 10 and 20 and the barrier ribs 21 are injected with an inert mixed gas for a discharge, such as He+Xe, Ne+Xe or He+Ne+Xe.

Figure 2:
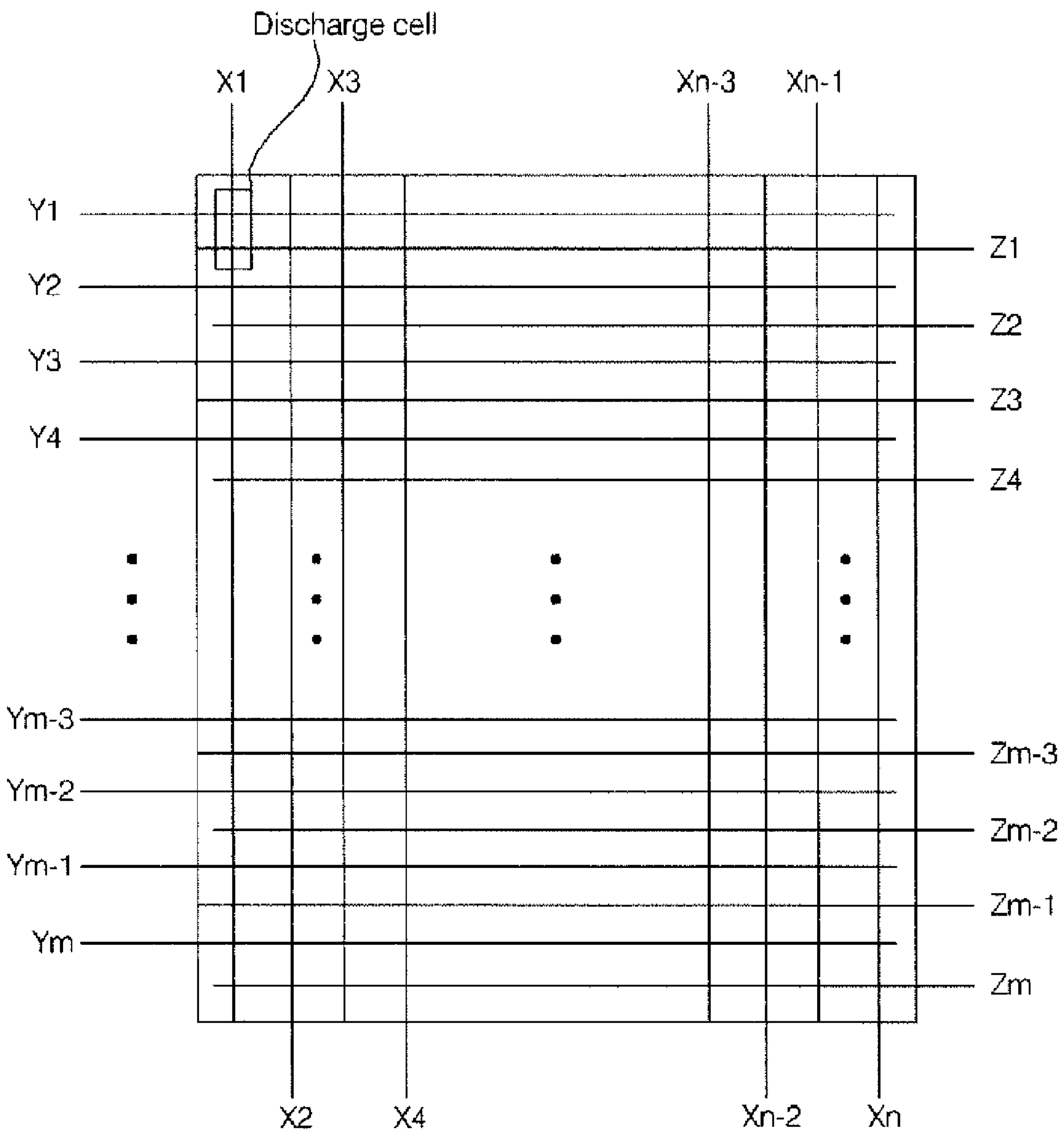
FIG. 2 is a diagram showing an embodiment with respect to the arrangement of electrodes of the plasma display panel.

FIG. 2 is a diagram showing an embodiment with respect to the arrangement of electrodes of the plasma display panel. It may be preferred that a plurality of discharge cells constituting the plasma display panel be arranged in matrix form, as illustrated in FIG. 2. The plurality of discharge cells are disposed at the intersections of scan electrode lines Y1 to Ym, sustain electrodes lines Z1 to Zm, and address electrodes lines X1 to Xn, respectively. The scan electrode lines Y1 to Ym may be driven sequentially or at the same time. The sustain electrode lines Z1 to Zm may be driven sequentially or at the same time. The address electrode lines X1 to Xn may be driven by dividing them into even-numbered lines and odd-numbered lines or driving them sequentially.

The electrode arrangement shown in FIG. 2 is only an embodiment with respect to the electrode arrangement of the plasma display panel according to the present invention. Accordingly, the present invention is not limited to the electrode arrangement and the method of driving the plasma display panel shown in FIG. 2. For example, the present invention may be applied to a dual scan method of driving two of the scan electrode lines Y1 to Ym at the same time. Alternatively, the address electrode lines X1 to Xn may be driven by dividing them into upper and lower parts on the basis of the center of the plasma display panel.

Figure 3:
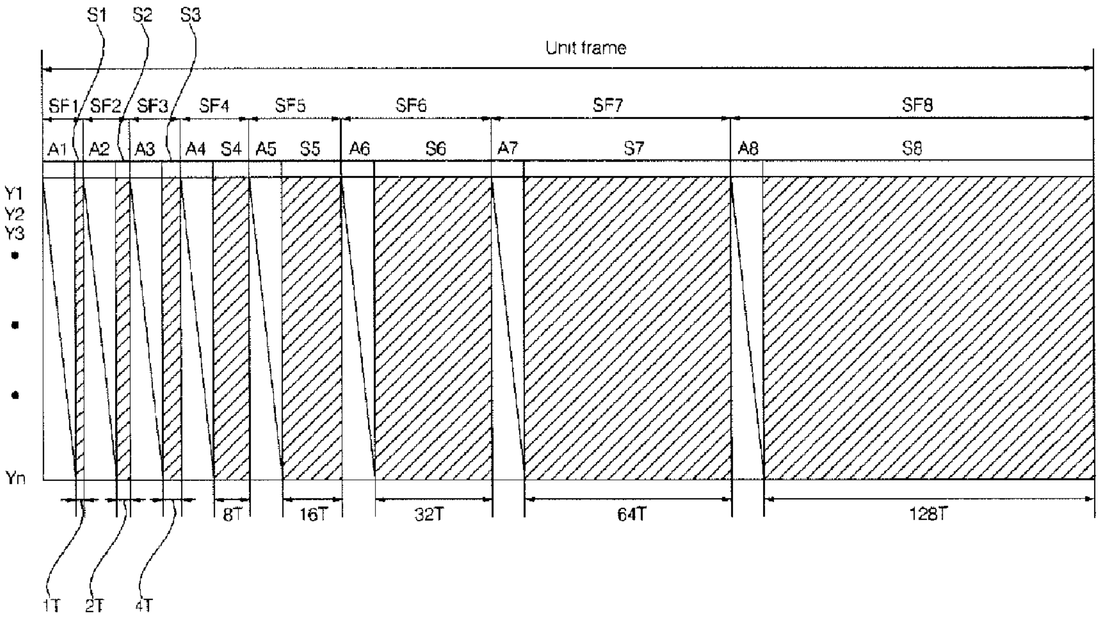
FIG. 3 is a timing diagram showing an embodiment with respect to a method of dividing one frame into a plurality of subfields and driving a plasma display panel in a time-divided manner.

FIG. 3 is a timing diagram showing an embodiment with respect to a method of dividing one frame into a plurality of subfields and driving a plasma display panel in a time-divided manner. A unit frame may be divided into a predetermined number (for example, eight) of subfields SF1, . . . , SF8 in order to realize a time dividing gray level display. Each of the subfields SF1, . . . , SF8 is divided into a reset period (not shown), address periods A1, . . . , A8, and sustain periods S1, . . . , S8.

According to an embodiment of the present invention, the reset period may be omitted in at least one of the plurality of subfields. For example, the reset period may exist only in the first subfield, or exist only in a subfield approximately between the first subfield and the entire subfields.

In each of the address periods A1, . . . , A8, a display data signal is applied to the address electrode X, and scan signals corresponding to the scan electrodes Y are sequentially applied to the address electrode X.

In each of the sustain periods S1, . . . , S8, a sustain pulse is alternately applied to the scan electrodes Y and the sustain electrodes Z. Accordingly, a sustain discharge is generated in discharge cells on which wall charges are formed in the address periods A1, . . . , A8.

The luminance of the plasma display panel is proportional to the number of sustain discharge pulses within the sustain periods S1, . . . , S8, which is occupied in a unit frame. In the case in which one frame to form 1 image is represented by eight subfields and 256 gray levels, different numbers of sustain pulses may be sequentially allocated to the respective subfields at a ratio of 1, 2, 4, 8, 16, 32, 64, and 128. For example, in order to obtain the luminance of 133 gray levels, a sustain discharge can be generated by addressing the cells during the subfield1 period, the subfield3 period, and the subfield8 period.

The number of sustain discharges allocated to each subfield may be varied depending on the weight of a subfield according to an automatic power control (APC) step. In other words, although an example in which one frame is divided into eight subfields has been described with reference to FIG. 3, the present invention is not limited to the above example, but the number of subfields to form one frame may be changed in various ways depending on design specifications. For example, the plasma display panel may be driven by dividing one frame into eight or more subfields, such as 12 or 16 subfields.

Further, the number of sustain discharges allocated to each subfield may be changed in various ways in consideration of gamma characteristics or panel characteristics. For example, the degree of gray levels allocated to the subfield4 may be lowered from 8 to 6, and the degree of gray levels allocated to the subfield6 may be raised from 32 to 34.

Figure 4:
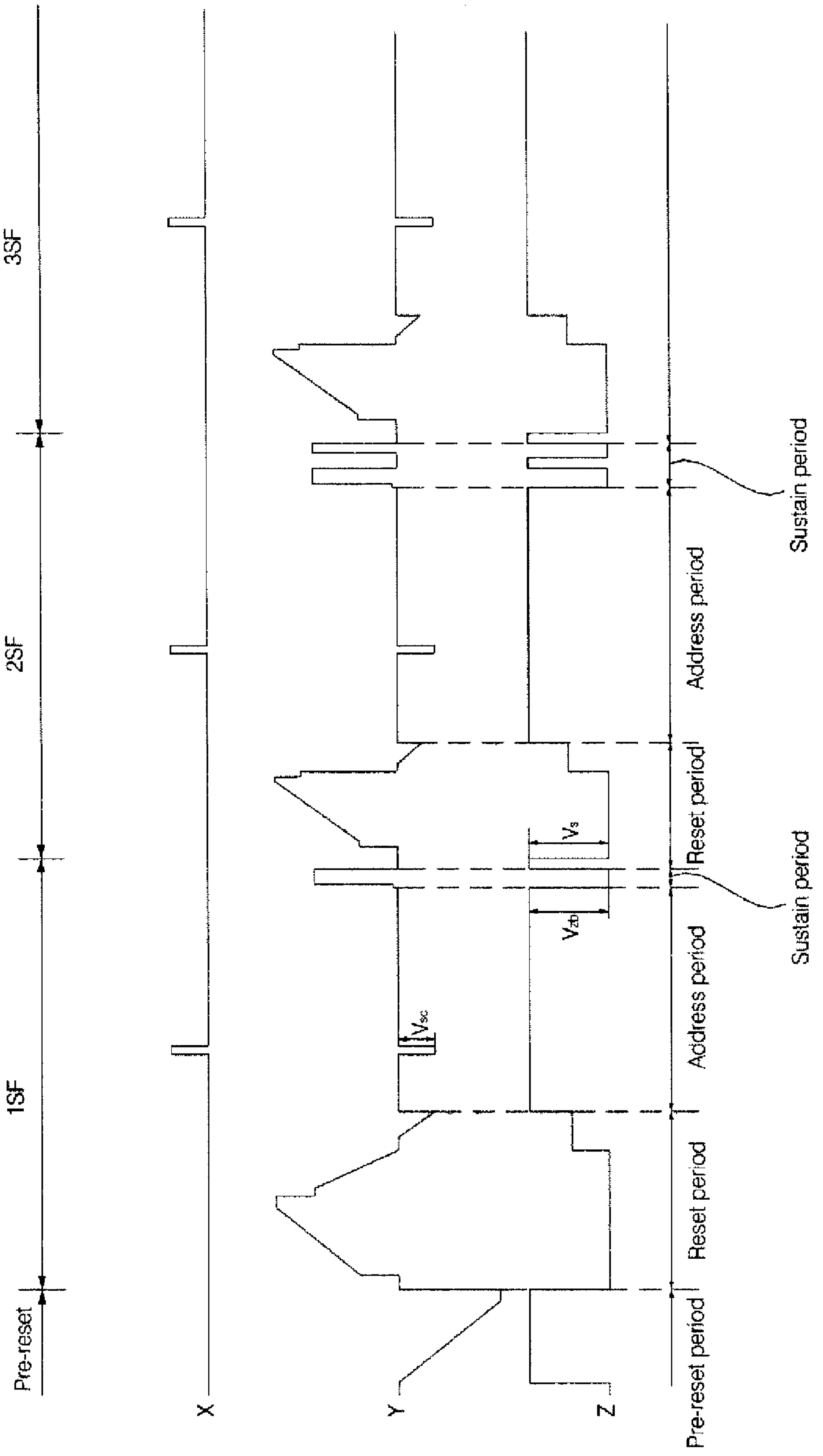
FIG. 4 is a timing diagram showing an embodiment with respect to waveforms of driving signals for driving the plasma display panel.

FIG. 4 is a timing diagram showing an embodiment with respect to waveforms of driving signals for driving the plasma display panel.

Each subfield includes a pre-reset period during which positive wall charges are formed on the scan electrodes Y and negative wall charges are formed on the sustain electrodes Z, a reset period during which discharge cells of the entire screen are reset using wall charge distributions formed in the pre-reset period, an address period during which discharge cells are selected, and a sustain period during which the discharge of selected discharge cells is sustained.

The reset period includes a set-up period and a set-down period. In the set-up period, a ramp-up waveform is applied to the entire scan electrodes at the same time, so that a minute discharge occurs in the entire discharge cells and wall charges are generated accordingly. In the set-down period, a ramp-down waveform, which falls from a positive voltage lower than a peak voltage of the ramp-up waveform, is applied to the entire scan electrodes Y at the same time, so that an erase discharge occurs in the entire discharge cells. Accordingly, unnecessary charges are erased from the wall charges generated by the set-up discharge and spatial charges.

In the address period, scan signals, each having scan voltages (Vsc) of negative polarity, are sequentially applied to the scan electrodes Y and, at the same time, data signals of positive polarity are applied to the address electrodes X. Address discharge is generated by a voltage difference between the scan signal and the data signal and a wall voltage generated during the reset period, so the cells are selected. Meanwhile, in order to enhance the efficiency of the address discharge, a sustain bias voltage (Vzb) is applied to the sustain electrode during the address period.

During the address period, the plurality of scan electrodes Y may be divided into two or more groups and sequentially supplied with the scan signals on a group basis. Each of the divided groups may be divided into two or more subgroups and sequentially supplied with the scan signals on a subgroup basis. For example, the plurality of scan electrodes Y may be divided into a first group and a second group. For example, the scan signals may be sequentially supplied to the scan electrodes belong to the first group, and then sequentially supplied to the scan electrodes belong to the second group.

In an embodiment of the present invention, the plurality of scan electrodes Y may be divided into a first group, located at an even-numbered position, and a second group, located at an odd-numbered position, depending upon positions where the electrodes are formed on the panel. In another embodiment, the plurality of scan electrodes Y may be divided into a first group, disposed on an upper side, and a second group, disposed on a lower side, on the basis of the center of the panel.

The scan electrodes, which belong to the first group divided according to the above method, may be divided into a first subgroup located at an even-numbered position and a second subgroup located at an odd-numbered position, or a first subgroup disposed on an upper side and a second subgroup disposed on a lower side on the basis of the center of the first group.

In the sustain period, a sustain pulse having a sustain voltage (Vs) is alternately applied to the scan electrodes and the sustain electrodes, so a sustain discharge is generated between the scan electrodes and the sustain electrodes in a surface discharge fashion.

The width of a first sustain signal or a last sustain signal, of the plurality of sustain signals, which are alternately applied to the scan electrodes and the sustain electrodes in the sustain period, may be greater than that of the remaining sustain pulses.

After the sustain discharge is generated, an erase period in which wall charges remaining in scan electrodes or sustain electrodes of an on-cell selected in the address period are erased by generating a weak discharge may be further included posterior to the sustain period.

The erase period may be included in all the plurality of subfields or some of the plurality of subfields. In this erase period, it may be preferred that an erase signal for the weak discharge may be applied to electrodes to which the last sustain pulse was not applied in the sustain period.

The erase signal may include a ramp form signal that gradually rises, a low-voltage wide pulse, a high-voltage narrow pulse, an exponential signal, a half-sinusoidal pulse or the like.

In addition, in order to generate the weak discharge, a plurality of pulses may be applied to the scan electrodes or the sustain electrodes sequentially.

The driving waveforms shown in FIG. 4 illustrate embodiments with respect to signals for driving the plasma display panel according to the present invention. However, the present invention is not limited to the waveforms shown in FIG. 4. For instance, the pre-reset period may be omitted, the polarities and voltage levels of the driving signals shown in FIG. 4 may be changed according to conditions, and an erase signal for erasing wall charges may be applied to the sustain electrodes after the sustain discharge is completed. Alternatively, a single sustain driving method of generating a sustain discharge by applying the sustain signal to either the scan electrodes Y or the sustain electrodes Z is also possible.

Figure 5:
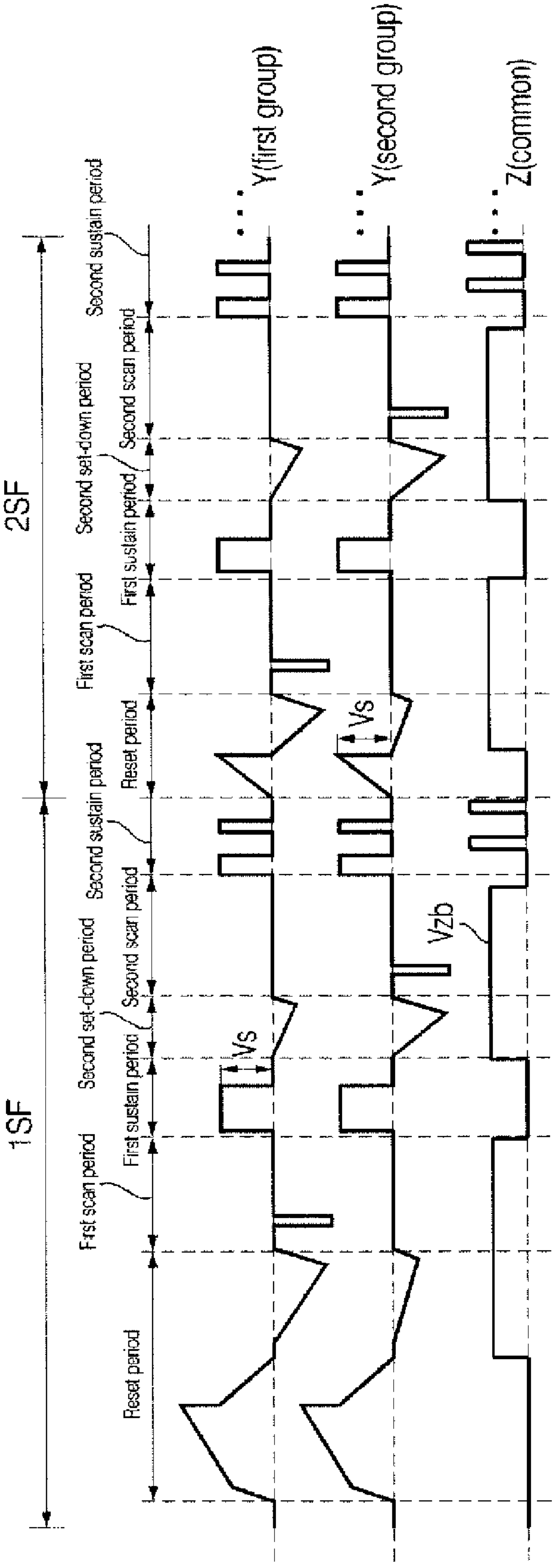
FIG. 5 is a timing diagram showing an embodiment with respect to driving waveforms in a state where scan electrodes of the plasma display panel are divided into two groups.

FIG. 5 is a timing diagram showing an embodiment with respect to an apparatus for dividing the scan electrodes of the plasma display panel into two groups and driving the same. The plurality of scan electrodes may be divided into two or more groups including first and second groups.

Moreover, the plurality of scan electrodes may be divided into the first group located at an even-numbered position, and the second group located at an odd-numbered position. At least one subfield may include a reset period, a plurality of scan and sustain periods, and a set-down period.

The reset period is a period during which wall charge states formed in the entire scan electrodes Y are reset.

In the first scan period, a scan pulse is applied with respect to the discharge cells formed by the scan electrodes of the first group, and correspondingly, a data pulse is applied to the address electrodes to perform an address operation. Therefore, the cells to be on are selected from among the scan electrodes of the first group. Then, it leads to the first sustain period during which the cells to be on of the first group are sustain-discharged. In the first sustain period, a sustain signal may be applied in a pair to the scan electrodes and the sustain electrodes, or may be applied only to the scan electrodes.

Thereafter, the second set-down period may be further included to erase unnecessary wall charges.

Next, in the second scan period, a scan pulse is applied with respect to the discharge cells formed by the scan electrodes of the second group, and correspondingly, a data pulse is applied to the address electrodes to perform an address operation. Accordingly, the cells to be on are selected from among the scan electrodes of the second group. Then, it leads to the second sustain period during which the cells to be on of the second group are sustain-discharged. According to a required discharge frequency of the corresponding subfield, the second sustain period may further include a period during which the entire cells to be on are sustain-discharged, after the sustain discharge of the second group.

As described above, when the cells constituting the panel are divided by electrode lines and driven, the address operation and the sustain discharge are performed on the first group, and then performed on the second group. Thus, a time to perform the address operation on the first group and then the sustain discharge thereon is shorter than a time to perform the address operation on the entire line scan electrodes and then the sustain discharge thereon. As a result, a temporal gap between the address (scan) period and the sustain period is minimized, so that it is possible to smoothly generate the sustain discharge in the sustain period and accomplish high-speed driving.

However, the address discharge does not occur in the first group during the second scan period. Therefore, it is necessary to maintain the wall charge state formed in the first sustain period till the second sustain period. As the time elapses, some of the wall charges naturally disappear. According to a driving environment, deficient wall charges destabilize the sustain discharge of the second group, or cause a flickering erroneous discharge where the cells to be on are not on.

Figure 6:
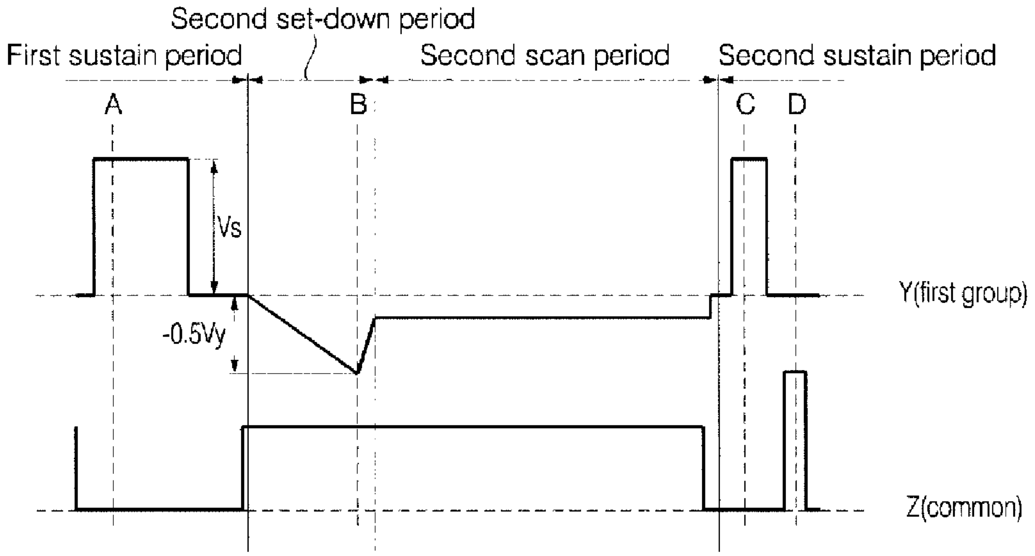
FIG. 6 is a timing diagram showing another embodiment with respect to the driving waveforms of the plasma display panel.
Figure 7:
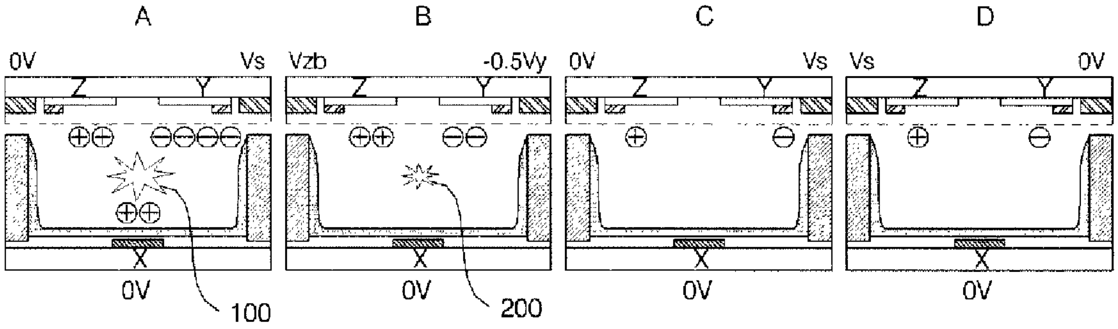
FIG. 7 is a schematic view showing wall charge distributions in respective periods of the driving waveforms of the plasma display panel.

FIG. 6 is a timing diagram showing another embodiment with respect to the driving waveforms of the plasma display panel, and FIG. 7 is a schematic view showing wall charge distributions in the respective periods of the driving waveforms of FIG. 6. FIG. 6 illustrates periods following the first sustain period with respect to the first group and the sustain electrodes Z.

Referring to FIGS. 6 and 7, in the first sustain period, a sustain signal having a size of a sustain voltage is applied to the scan electrodes Y of the first group.

While a voltage is not applied to the sustain electrodes Z and the address electrodes X, a voltage of positive polarity is applied to the scan electrodes Y. Therefore, the sum of the wall charges accumulated on the scan electrodes Y and the external voltage applied to the scan electrodes Y is over a discharge firing voltage, so that the sustain discharge occurs.

Since the sustain discharge is a strong discharge 100 and the external voltage is continuously applied, the polarity of the wall charges may be reversed after the discharge, which is shown in FIG. 7A.

In the second set-down period, a signal gradually falling to a voltage −Vy of negative polarity is supplied to the scan electrodes Y of the second group, so that unnecessary charges are erased from the wall charges and the wall charge distribution is made even for the address discharge of the second group. In addition, a bias voltage Vzb of positive polarity may be supplied to the sustain electrodes, overlapping with at least some period of the set-down period.

Moreover, in the second set-down period, it is possible to make the voltage gradually fall by applying a voltage −0.5 Vy having half a size of the voltage of negative polarity applied to the second group to the scan electrodes of the first group, or floating the scan electrodes. The sustain electrodes may include a floating period.

In the second scan period, the address discharge of the second group occurs. However, the first group experiencing the address discharge in the first scan period maintains a ground voltage or bias voltage during the succeeding second sustain period. As compared with the second group, the first group spends a relatively long time from the address discharge to the second sustain period during which a lot of sustain signals are applied according to circuit load and display gray, such that a certain amount of wall charges may be lost. Further, as shown in FIG. 7B, when a weak discharge 200 occurs due to a potential difference caused by application of the wall voltage of negative polarity, the amount of the wall charges decreases due to erase of the wall charges.

The second scan period sequentially leads to the second sustain period during which a sustain signal is alternately supplied to the scan electrodes and the sustain electrodes. Since the sustain discharge has occurred merely in the first group during the first sustain period, in order to reduce a brightness difference between the scan electrodes of the first and second groups, the discharge can be controlled to occur in C time point of FIG. 7 and not to occur in D time point of FIG. 7. In C time point, since the address discharge has not occurred in the second scan period, the external applied voltage and the wall charges have opposite polarities, not reaching a discharge firing voltage, so that the discharge does not occur. However, the discharge may not occur in D time point where the sustain discharge is supposed to occur because of loss of the wall charges mentioned above, i.e. an erroneous discharge may occur.

Figure 8:
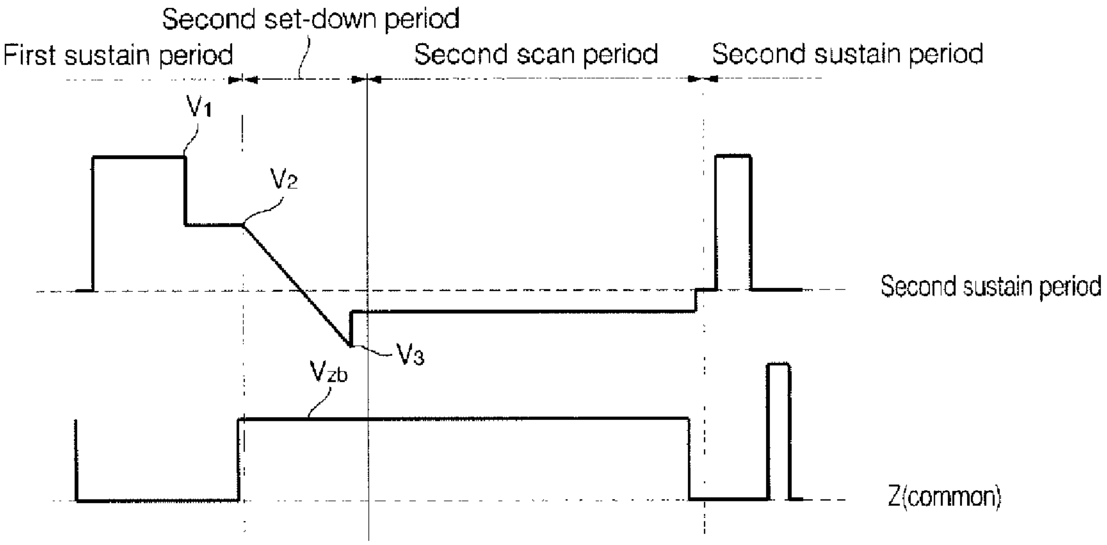
FIG. 8 is a timing diagram showing a further embodiment with respect to the driving waveforms of the plasma display panel.

FIG. 8 is a timing diagram showing a further embodiment with respect to the driving waveforms of the plasma display panel.

The plasma display apparatus according to the present invention includes a plurality of scan electrodes and sustain electrodes. The plurality of scan electrodes are divided into two or more groups including first and second groups, and one frame is composed of a plurality of subfields.

At least one of the plurality of subfields sequentially includes: a first scan period during which a scan signal is supplied to the first group; a first sustain period during which a signal having a voltage of positive polarity is supplied to the first and second groups; a second set-down period during which the voltage of the first group gradually falls and a voltage of negative polarity is supplied to the second group; and a second scan period during which a scan signal is supplied to the second group.

In the second set-down period, an absolute value of a sustain bias voltage Vzb of positive polarity supplied to the sustain electrodes is larger than an absolute value of the lowest voltage V3 of the first group.

In addition, the plurality of scan electrodes may be divided into the first group located at an even-numbered position, and the second group located at an odd-numbered position.

In the second set-down period, a voltage gradually falling from a second voltage V2 of positive polarity is supplied to the first group. Here, the sustain bias voltage Vzb is supplied to the sustain electrodes Z.

In the second set-down period, the lowest voltage V3 of the first group may be a ground voltage or a voltage of negative polarity.

However, even if the lowest voltage V3 of the first group falls to negative polarity, since its absolute value is controlled smaller than the absolute value of the sustain bias voltage Vzb, a potential difference between the sustain electrodes and the first group is not large, so the discharge does not occur. Accordingly, the wall charges are not erased by a weak discharge. As a result, a lot of wall charges can be maintained till the second sustain period.

Also, the first sustain period may include a period during which the voltage of the first group sustains a first voltage, and a period during which the voltage of the first group sustains a second voltage. In this case, an absolute value of the second voltage may be smaller than an absolute value of the first voltage. The voltage of the first group may fall from the first voltage to the second voltage in the form of a stair or ramp.

In addition, in at least some period of the second set-down period, the scan electrodes of the first group may be floated to make the voltage gradually fall.

Moreover, the first voltage may be a sustain voltage. In this case, since a special power circuit is not added, the circuit construction is simplified and costs are cut down.

Figure 9:
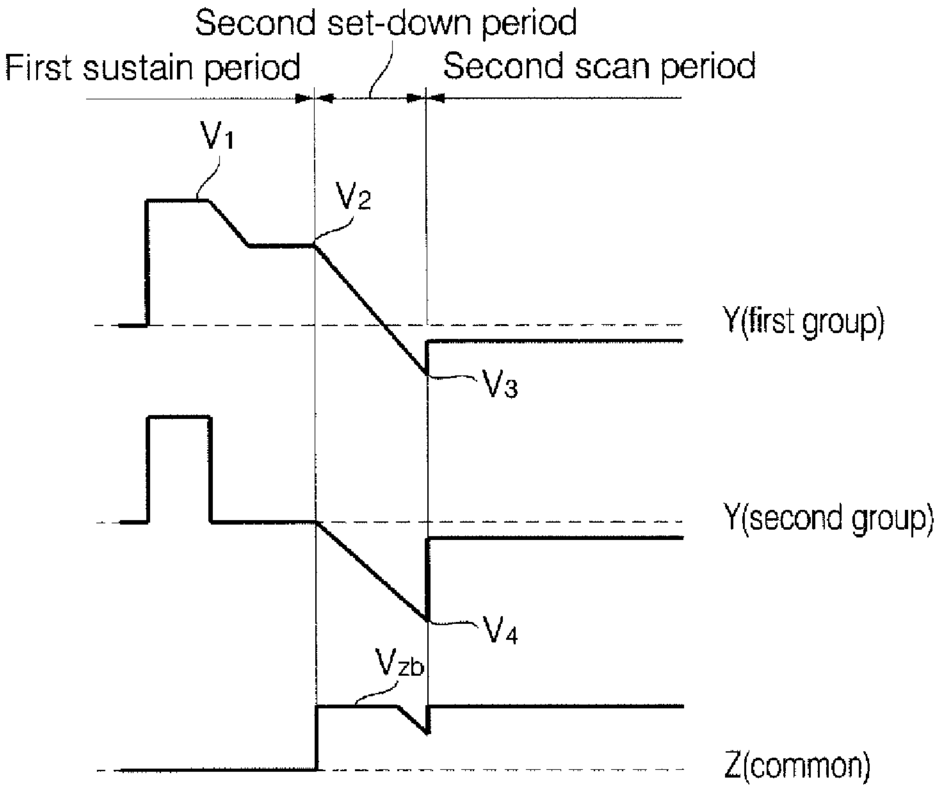
FIG. 9 is a timing diagram showing a still further embodiment with respect to the driving waveforms of the plasma display panel.

FIG. 9 is a timing diagram showing a still further embodiment with respect to the driving waveforms of the plasma display panel.

The plasma display apparatus according to the present invention includes a plurality of scan electrodes and sustain electrodes. The plurality of scan electrodes are divided into two or more groups including first and second groups, and one frame is composed of a plurality of subfields.

At least one of the plurality of subfields includes: a first scan period during which a scan signal is supplied to the first group; a second set-down period during which a voltage gradually falling from a second voltage V2 of positive polarity is supplied to the first group and a voltage of negative polarity is supplied to the second group; and a second scan period during which a scan signal is supplied to the second group.

In addition, the plurality of scan electrodes may be divided into the first group located at an even-numbered position, and the second group located at an odd-numbered position.

In the second set-down period, the lowest voltage V3 of the first group may be a ground voltage or a voltage of negative polarity.

However, even if the lowest voltage V3 of the first group falls to negative polarity, since the voltage of the first group is the second voltage of positive polarity at an application time point of a sustain bias voltage Vzb and a potential difference between the sustain electrodes and the first group is not large, the discharge does not occur. Then, the voltage of the first group gradually falls. Accordingly, the wall charges are not erased by a weak discharge. Consequently, a lot of wall charges can be maintained till the second sustain period.

Moreover, the at least one subfield may further include a first sustain period during which a signal having a voltage of positive polarity is supplied to the first and second groups, such that the discharge occurs in the electrodes of the first group.

In the second set-down period, the erased amount of the wall charges of the second group is controlled according to a size of the lowest voltage V4 of the second group. If an absolute value of the lowest voltage V4 of the second group is large, the erased amount of the wall charges is large.

Further, the voltage of negative polarity may gradually fall. In the second set-down period, the absolute value of the lowest voltage V4 of the second group may be larger than the absolute value of the lowest voltage V3 of the first group.

As the address discharge occurs in the second group during the succeeding second scan period, the amount of the wall charges can be made uniform in the second set-down period.

Furthermore, in at least some period of the second set-down period, the scan electrodes of the first group may be floated to make the voltage gradually fall. The at least some period of the second set-down period may include a period during which the sustain electrodes are floated to make the voltage gradually fall.

Still furthermore, the first sustain period may include a period during which the voltage of the first group sustains a first voltage, and a period during which the voltage of the first group sustains a second voltage. In this case, an absolute value of the second voltage may be smaller than an absolute value of the first voltage. The voltage of the first group may fall from the first voltage to the second voltage in the form of a stair or ramp.

The plasma display apparatus according to the present invention includes a plurality of scan electrodes and sustain electrodes. The plurality of scan electrodes are divided into two or more groups including first and second groups, and one frame is composed of a plurality of subfields.

At least one of the plurality of subfields sequentially includes: a first scan period during which a scan signal is supplied to the first group; a first sustain period during which a first voltage V1 of positive polarity is supplied to the first and second groups; a second set-down period during which a voltage gradually falling from a second voltage V2 of positive polarity is supplied to the first group and a voltage of negative polarity is supplied to the second group; and a second scan to period during which a scan signal is supplied to the second group.

In addition, the plurality of scan electrodes may be divided into the first group located at an even-numbered position, and the second group located at an odd-numbered position.

Figure 10:
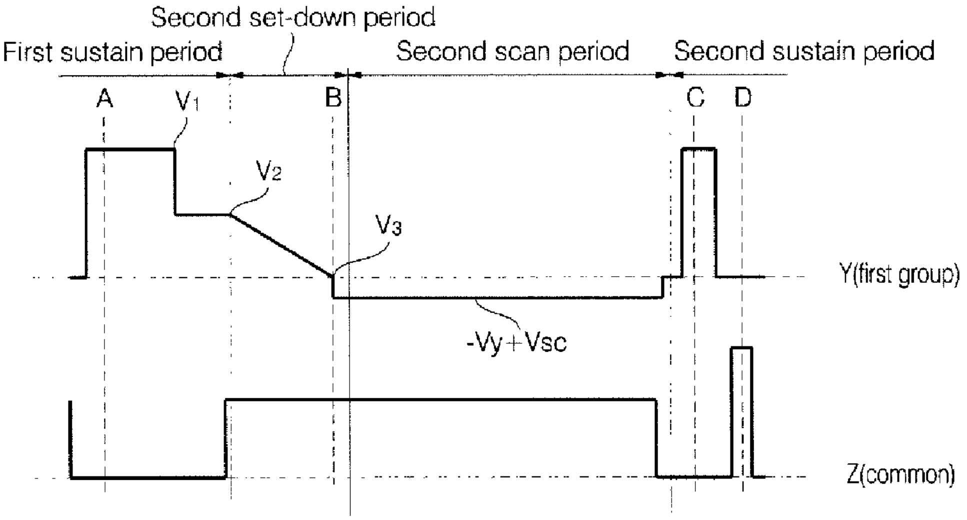
FIG. 10 is a timing diagram showing a still further embodiment with respect to the driving waveforms of the plasma display panel.
Figure 11:
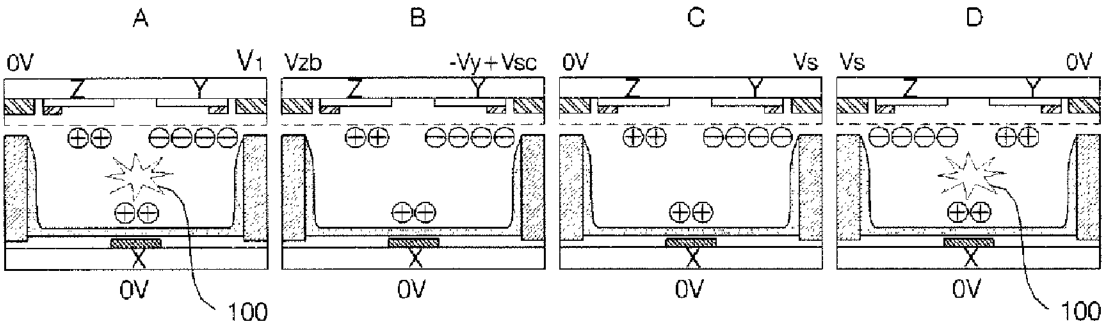
FIG. 11 is a schematic view showing wall charge distributions in respective periods of the driving waveforms of the plasma display panel.

FIG. 10 is a timing diagram showing a still further embodiment with respect to the driving waveforms of the plasma display panel, and FIG. 11 is a schematic view showing wall charge distributions in the respective periods of the driving waveforms of FIG. 10. FIG. 11 illustrates periods following the first sustain period with respect to the first group and the sustain electrodes Z.

Also, FIG. 11 schematically illustrates the wall charge distributions in the respective periods of the driving waveforms of FIG. 10. However, it is apparent that the driving waveforms of FIGS. 8 and 9 have identical or similar wall charge distributions in common portions to the driving waveforms of FIG. 10.

As shown in FIGS. 10 and 11, in the first sustain period during which the first voltage V1 of positive polarity is supplied to the first and second groups, a sustain discharge 100 occurs in the scan electrodes of the first group experiencing the address discharge in the first scan period. The sustain discharge 100 is a strong discharge, so that polarity of the wall charges formed on the electrodes may be reversed, which is shown in FIG. 11A.

The first voltage V1 may be identical to a sustain voltage. In this case, since a special power circuit is not added, the circuit construction is simplified and costs are cut down.

In addition, the first sustain period may further include a period during which a sustain signal supplied to the first group sustains the second voltage V2. That is, in the first sustain period, the sustain signal falls from the first voltage V1 to the second voltage V2, and sustains the second voltage V2. When the second set-down period starts, the voltage may gradually fall from the second voltage V2.

Moreover, the second voltage V2 may be set having an absolute value smaller than that of the first voltage V1.

In the second set-down period, a voltage gradually falling from the second voltage V2 of positive polarity is supplied to the first group. Here, since a sustain bias voltage is supplied to the sustain electrodes Z, the voltages supplied to both electrodes are of positive polarity. A potential difference thereof is not large, so that the discharge does not occur. Accordingly, the wall charges are not erased by a weak discharge. As a result, a lot of wall charges can be maintained till the second sustain period.

Further, in at least some period of the second set-down period, the scan electrodes of the first group may be floated to make the voltage gradually fall.

Since the address discharge occurs in the second group during the second scan period, a voltage of negative polarity is supplied to the second group during the second set-down period, thereby generating a weak discharge. Such a weak discharge adjusts the wall charge distribution to smoothly generate the address discharge.

Thereafter, in the second sustain period, a voltage of positive polarity is alternately applied to the scan electrodes and the sustain electrodes. However, since the wall charge distribution has the opposite polarity to that of the external applied voltage in C time point, the sum of the external applied voltage and the wall voltage does not exceed a discharge firing voltage in the first group, so that the discharge does not occur. In D time point, a normal strong discharge 100 occurs due to the wall charges formed on the Z electrodes and application of a sustain voltage. The polarity of the wall charge distribution can be reversed due to the strong discharge and the external applied voltage.

The plasma display apparatus according to the present invention supplies the voltage falling from the second voltage of positive polarity to the first group in the second set-down period, thereby preventing the discharge from occurring in the second set-down period, erasing the wall charges. As a result, a loss of the wall charges can be reduced, and the sustain discharge can be stably generated in the second sustain period.

The second voltage may be a scan voltage. In this case, since a special power circuit is not added, the circuit construction is simplified and costs are cut down.

Figure 12:
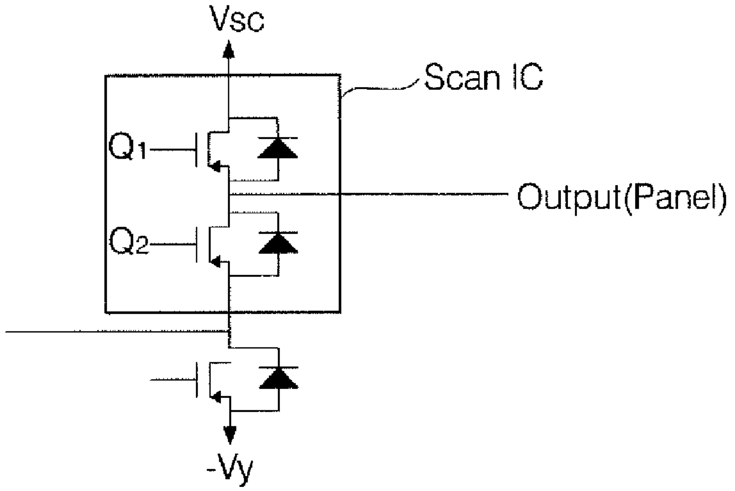
FIG. 12 is a view showing an embodiment with respect to a portion of a driving circuit of the plasma display panel.

FIG. 12 is a view showing an embodiment with respect to a portion of a driving circuit of the plasma display panel, particularly, a scan IC Q1 and Q2 connected to a scan voltage source and a panel. It is connected to a sustain voltage supply unit (not shown) and an energy recovery circuit (not shown).

Figure 13:
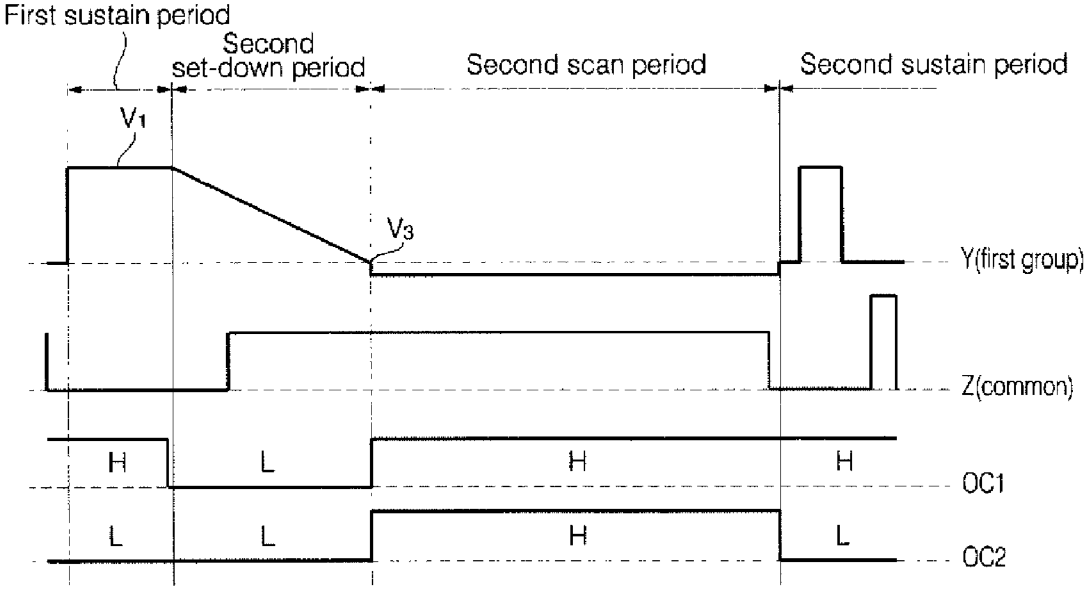
FIGS. 13 and 14 are timing diagrams showing still further embodiments with respect to the driving waveforms of the plasma display panel according to the present invention.

FIG. 13 is a timing diagram showing a still further embodiment with respect to the driving waveforms of the plasma display panel according to the present invention with control signals for controlling the scan IC Q1 and Q2.

In the plasma display apparatus according to the present invention, as shown in FIG. 13, a second voltage starting to gradually fall in the second set-down period is identical to a first voltage. That is, since the first voltage V1 and the second voltage V2 are identical, the first voltage V1 is sustained in the first sustain period, and starts to gradually fall in the second set-down period.

Also, the voltage gradually falling from the second voltage of positive polarity, which is supplied to the first group, may fall to a third voltage. In this case, the third voltage may be a ground voltage.

In addition, in the succeeding second scan period, the ground voltage may be sustained or a scan bias voltage may be sustained.

OC1 and OC2 signals may be input to the scan IC Q1 and Q2 as control signals so that the scan IC Q1 and Q2 can supply a driving signal to the scan electrodes Y. An embodiment with respect to a method of controlling the scan IC Q1 and Q2 using the control signals is shown in the following table 1.

TABLE 1

| Data | OC1 | OC2 | Output |
|---|---|---|---|
| H or L | L | L | Floating (High Z) |
| H or L | H | L | L |
| H or L | H | H | H |
| H | L | H | L |
| L | L | H | H |

When the OC1 and OC2 have a low level voltage, an output of the scan IC Q1 and Q2 becomes a high impedance High Z by floating, and when the OC1 and OC2 have a high level voltage, a driving signal input through the scan-up switch Q1 between the two signals input to the scan IC Q1 and Q2 is output from the scan IC Q1 and Q2.

When the OC1 has a high level voltage and the OC2 has a low level voltage, a driving signal input through the scan-down switch Q2 between the two signals input to the scan IC Q1 and Q2 is output from the scan IC Q1 and Q2.

In addition, when the OC1 has a low level voltage and the OC2 has a high level voltage, if a data signal input to the scan IC Q1 and Q2 has a high level voltage, a driving signal input through the scan-down switch Q2 is output from the scan IC Q1 and Q2, and if the data signal input to the scan IC Q1 and Q2 has a low level voltage, a driving signal input through the scan-up switch Q1 is output from the scan IC Q1 and Q2.

As illustrated in FIG. 13, in the first sustain period, the OC1 has a high level voltage and the OC2 has a low level voltage, so that the driving signal input to the scan IC Q1 and Q2 through the scan-down switch Q2 is supplied to the first group Y.

If a scan voltage is supplied, the OC1 has a low level voltage, the OC2 has a high level voltage, and the data signal input to the scan IC Q1 and Q2 has a low level voltage except a time point when the driving signal is applied to the scan electrodes Y, so that the scan voltage Vsc input through the scan-up switch Q1 is supplied to the scan electrodes Y.

In addition, in the second set-down period, the OC1 and OC2 may have a low level voltage such that the voltage gradually falls by floating.

The time point when the driving signal is applied to the scan electrodes Y can be controlled using an STB control signal. That is, when the data signal input to the scan IC Q1 and Q2 has a low level voltage and the STB has a high level voltage, a signal having a ground voltage GND, which is input through the scan-down switch Q2, may be supplied to the scan electrodes Y.

Figure 14:
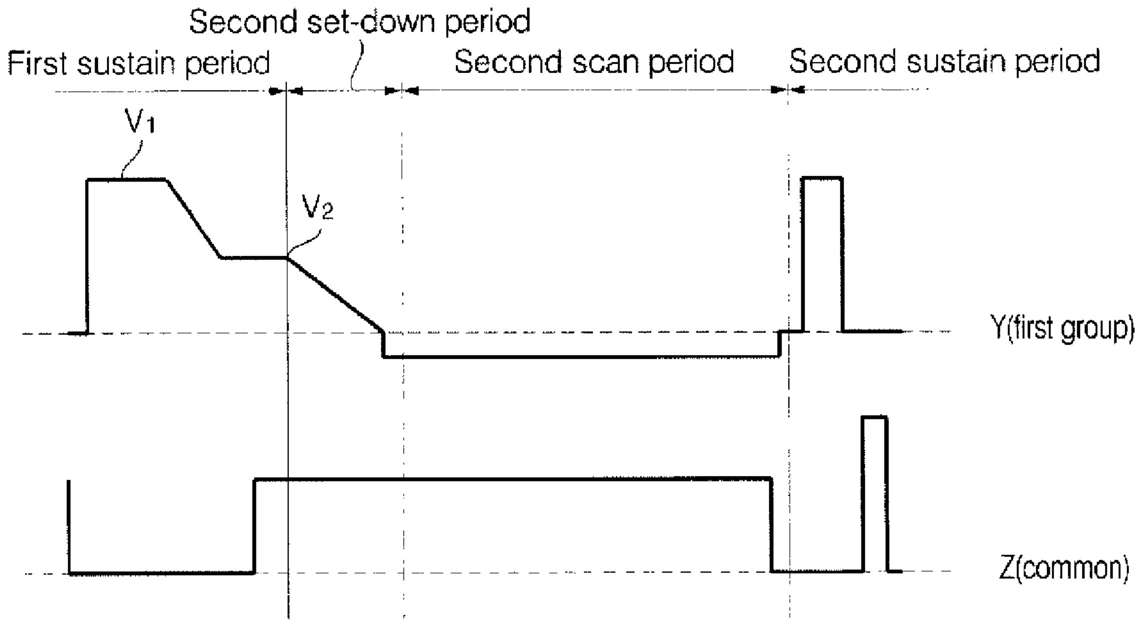

FIG. 14 is a timing diagram showing a still further embodiment with respect to the driving waveforms of the plasma display panel according to the present invention.

As illustrated in FIG. 14, at least some period of the first sustain period may further include a period during which the scan electrodes of the first group are floated to make a voltage gradually fall.

In the embodiments of FIGS. 13 and 14, the voltage falling from the second voltage of positive polarity is supplied to the first group in the second set-down period, to thereby reduce a potential difference from the sustain electrodes and prevent the discharge from occurring in the second set-down period, erasing wall charges. Accordingly, a loss of the wall charges can be reduced, and the sustain discharge can be stably generated in the second sustain period. Consequently, picture quality of a display image can be improved.

While the invention has been shown and described with respect to the preferred embodiments, it will be understood by those skilled in the art that various changes and modifications may be made without departing from the spirit and scope of the invention as defined in the following claims.

What is claimed is:

1. A plasma display apparatus, comprising a plurality of scan electrodes and sustain electrodes; and one or more drivers configured to supply signals to the plurality of scan electrodes and sustain electrodes, wherein the signals correspond to a frame that includes a plurality of subfields, wherein the plurality of scan electrodes are divided into two or more groups including first and second groups, wherein at least one of the plurality of subfields sequentially comprises:

a first scan period during which the one or more drivers are configured to supply a scan signal to the first group;

a first sustain period during which the one or more drivers are configured to supply a signal having a voltage of positive polarity to the first and second groups;

a second set-down period during which the one or more drivers are configured to gradually reduce the voltage of the first group and to supply a voltage of negative polarity to the second group; and a second scan period during which the one or more drivers are configured to supply a scan signal to the second group, and wherein an absolute value of a sustain bias voltage of positive polarity supplied to the sustain electrodes is larger than an absolute value of the lowest voltage of the first group in the second set-down period, as claimed (emphasis added).

2. The plasma display apparatus of claim 1, wherein the plurality of scan electrodes are divided into the first group located at an even-numbered position, and the second group located at an odd-numbered position.

3. The plasma display apparatus of claim 1, wherein the first sustain period comprises a period during which the voltage of the first group sustains a first voltage, and a period during which the voltage of the first group sustains a second voltage.

4. The plasma display apparatus of claim 3, wherein an absolute value of the second voltage is smaller than an absolute value of the first voltage.

5. The plasma display apparatus of claim 1, wherein the one or more drivers are configured to float the scan electrodes of the first group during at least some period of the second set-down period.

6. The plasma display apparatus of claim 1, wherein the first voltage is a sustain voltage.

7. A plasma display apparatus, comprising a plurality of scan electrodes and sustain electrodes; and one or more drivers configured to supply signals to the plurality of scan electrodes and sustain electrodes, wherein the signals correspond to a frame that includes a plurality of subfields, wherein the plurality of scan electrodes are divided into two or more groups including first and second groups, wherein at least one of the plurality of subfields sequentially comprises:

a first scan period during which the one or more drivers are configured to supply a scan signal to the first group;

a second set-down period during which the one or more drivers are configured to supply a voltage gradually falling from a second voltage of positive polarity to the first group and a voltage of negative polarity to the second group; and a second scan period during which the one or more drivers are configured to supply a scan signal to the second group, as claimed (emphasis added).

8. The plasma display apparatus of claim 7, wherein the at least one subfield further comprises a first sustain period during which the one or more drivers are configured to supply a signal having a voltage of positive polarity to the first and second groups.

9. The plasma display apparatus of claim 7, wherein the plurality of scan electrodes are divided into the first group located at an even-numbered position, and the second group located at an odd-numbered position.

10. The plasma display apparatus of claim 7, wherein the voltage of negative polarity gradually falls.

11. The plasma display apparatus of claim 7, wherein an absolute value of the lowest voltage of the second group is larger than an absolute value of the lowest voltage of the first group in the second set-down period.

12. The plasma display apparatus of claim 7, wherein the one or more drivers are configured to float the scan electrodes of the first group during at least some period of the second set-down period.

13. A plasma display apparatus, comprising a plurality of scan electrodes and sustain electrodes; and one or more drivers configured to supply signals to the plurality of scan electrodes and sustain electrodes, wherein the signals correspond to a frame that includes a plurality of subfields, wherein the plurality of scan electrodes are divided into two or more groups including first and second groups, wherein at least one of the plurality of subfields sequentially comprises:

a first scan period during which the one or more drivers are configured to supply a scan signal to the first group;

a first sustain period during which the one or more drivers are configured to supply a sustain signal having a size of a first voltage of positive polarity to the first and second groups;

a second set-down period during which the one or more drivers are configured to supply a voltage gradually falling from a second voltage of positive polarity to the first group and a voltage of negative polarity to the second group; and a second scan period during which a scan signal is supplied to the second group, as claimed (emphasis added).

14. The plasma display apparatus of claim 13, wherein the first sustain period further comprises a period during which the sustain signal supplied to the first group sustains the second voltage.

15. The plasma display apparatus of claim 13, wherein the first voltage is a sustain voltage.

16. The plasma display apparatus of claim 13, wherein an absolute value of the second voltage is smaller than an absolute value of the first voltage.

17. The plasma display apparatus of claim 13, wherein the second voltage is identical to the first voltage.

18. The plasma display apparatus of claim 13, wherein the voltage gradually falling from the second voltage of positive polarity, which is supplied to the first group, falls to a third voltage.

19. The plasma display apparatus of claim 18, wherein the third voltage is a ground voltage.

20. The plasma display apparatus of claim 13, wherein the one or more drivers are configured to float the scan electrodes of the first group during at least some period of the first sustain period.

* * * * *